(12) United States Patent
Beham et al.

(10) Patent No.: US 11,970,206 B2
(45) Date of Patent: Apr. 30, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Bryan Beham, Mauren (LI); René Marco Schmidt, Lienz (CH)

(73) Assignees: thyssenkrupp Presta AG, Eschon (LI); thyssenkrupp AG, Essen (DE)

( * ) Notice: Subject to any disclaimer, the term of this patent is extended or adjusted under 35 U.S.C. 154(b) by 225 days.

(21) Appl. No.: 17/432,375

(22) PCT Filed: Feb. 19, 2020

(86) PCT No.: PCT/EP2020/054353
§ 371 (c)(1),
(2) Date: Aug. 19, 2021

(87) PCT Pub. No.: WO2020/169665
PCT Pub. Date: Aug. 27, 2020

(65) Prior Publication Data
US 2022/0153336 A1    May 19, 2022

(30) Foreign Application Priority Data

Feb. 20, 2019 (DE) ..................... 10 2019 202 297.9

(51) Int. Cl.
*B62D 1/19*       (2006.01)
*B62D 1/181*      (2006.01)
(Continued)

(52) U.S. Cl.
CPC ............ *B62D 1/195* (2013.01); *B62D 1/181* (2013.01); *F16B 19/08* (2013.01); *F16B 31/021* (2013.01); *F16B 41/002* (2013.01)

(58) Field of Classification Search
CPC .......... B62D 1/195; B62D 1/19; B62D 1/192; F16B 19/08; F16B 31/021; F16B 41/002
See application file for complete search history.

(56) References Cited

U.S. PATENT DOCUMENTS 3,590,655 A    7/1971  Farrell et al.
5,755,461 A  * 5/1998  Halacka ................. B62D 1/195
                                                          74/492
(Continued)

FOREIGN PATENT DOCUMENTS

CA        1268100 A      4/1990
CN      207003833 U      2/2018
(Continued)

OTHER PUBLICATIONS

Eggers, DE 102004024876-A1, Machine Translation of Specification (Year: 2005).*
(Continued)

*Primary Examiner* — James A English
*Assistant Examiner* — Matthew Joseph Ganci
(74) *Attorney, Agent, or Firm* — thyssenkrupp North America, LLC (57) ABSTRACT

A steering column for a motor vehicle may include a crash device that has at least two components that have mutually facing surfaces. The at least two components may be connected to each other by means of a shear element that is arranged in an opening passing at least partially through the components such that the shear element is broken in two if the components move relative to each other. To improve the predetermined breaking connection, the opening may have, in at least one edge region bounding one of the mutually facing surfaces, a widened portion that extends at least over a partial circumferential region and is open towards the respective other surface.

11 Claims, 5 Drawing Sheets

(51) Int. Cl.
*F16B 19/08* (2006.01)
*F16B 31/02* (2006.01)
*F16B 41/00* (2006.01)

(56) References Cited

U.S. PATENT DOCUMENTS

| | | | |
|---|---|---|---|
| 9,061,379 B1 | 6/2015 | Mead et al. | |
| 9,533,700 B2 * | 1/2017 | Takahashi | ............. B62D 1/184 |
| 9,669,862 B1 | 6/2017 | Dubay et al. | |
| 2015/0232117 A1 | 8/2015 | Stinebring et al. | |
| 2021/0039706 A1 | 2/2021 | Schmidt | |

FOREIGN PATENT DOCUMENTS

| | | | | |
|---|---|---|---|---|
| DE | 10 2004 024 876 A1 | 4/2005 | | |
| DE | 102004024876 A1 * | 4/2005 | ............. | B62D 1/195 |
| DE | 10 2018 204 735 A1 | 10/2018 | | |
| EP | 3048031 A2 * | 7/2016 | ............. | B62D 1/184 |
| EP | 3357789 A2 * | 8/2018 | ............. | B62D 1/184 |
| JP | H1035411 A1 | 2/1998 | | |
| JP | 2015199449 A | 11/2015 | | |
| JP | 2018079821 A | 5/2018 | | |
| WO | 2005/028281 A1 | 3/2005 | | |

OTHER PUBLICATIONS

English Translation of International Search Report issued in PCT/EP2020/054353, dated May 13, 2020.

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/054353, filed Feb. 19, 2020, which claims priority to German Patent Application No. DE 10 2019 202 297.9, filed Feb. 20, 2019, the entire contents of both of which are incorporated herein by reference.

FIELD

The present disclosure generally relates to adjustable steering columns, including steering columns configured to absorb energy in a motor vehicle crash events.

BACKGROUND

Steering columns are known in various embodiments in the prior art for adapting the steering wheel position to the seating position of the driver of a motor vehicle. In generic steering columns, the steering wheel which is attached to the rear end of the steering spindle may be positioned in the longitudinal direction in the vehicle interior by a longitudinal adjustment in the direction of the steering spindle longitudinal axis.

The longitudinal adjustability is implemented by the inner jacket tube, which is also denoted as the internal jacket tube or the jacket tube for short, and in which the steering spindle is rotatably mounted, being adjustable in a telescopic manner in the direction of the longitudinal axis, i.e. in the longitudinal direction, relative to the outer jacket unit, also denoted as the external jacket unit or the jacket unit for short.

As an effective measure for improving the occupant safety in a vehicle collision, in the event of a so-called crash in which the driver strikes the steering wheel at high speed, it is known to design the steering column to be telescopable in the longitudinal direction and/or transversely thereto in the vertical direction when a force is exerted on the steering wheel which exceeds a limit value which is present only in the event of a crash, the so-called crash force. As a result, the steering wheel may be deflected in the event of a crash, whereby injuries to the occupants may be prevented.

In order to ensure a controlled braking of a body striking the steering wheel, an energy absorption device may also be coupled-in between two components of the steering column, which are moved relative to one another when the steering column is telescoped, for example between the outer jacket unit and the inner jacket tube or the components respectively connected thereto and/or between the adjusting unit bearing the steering spindle and a support unit for connecting to the vehicle body, or components respectively connected thereto. This energy absorption device is able to convert the introduced kinetic energy into the plastic deformation of one or more energy absorption elements, for example by tearing open a tear tab or distorting an elongated bending element, namely a bending wire or bending strip.

The components which are movable relative to one another in the event of a crash are connected together via a predetermined breaking element which in normal operation absorbs forces acting on the steering wheel and prevents the steering column from being telescoped and an optionally present energy absorption device responding. Only when a predetermined limit force is exceeded, which occurs in the event of a crash, does the predetermined breaking element break and release the relative movement of the components so that the steering column may be telescoped, wherein an optionally inserted energy absorption device may be activated.

In the prior art it is disclosed, for example, in US 2015/0232117 A1 that the two components lie against one another with their surfaces, which are oriented towards one another and which are configured as contact surfaces, in a plane parallel to the relative movement in the event of a crash, the so-called shear plane, and are held together by the shear element. The shear element extends through an opening passing through the components transversely, preferably perpendicular to the shear plane and, for example, is fixed by shear element heads, for example rivet heads, supported externally on the components, in the direction of passage of the opening. If the limit force in the event of a crash exceeds the shear strength of the shear element, the shear element is sheared off between the shear edges at the edge of the opening relative to the contact surfaces in the shear plane, i.e. into two separate shear element fragments which are called broken pieces or fragments for short, and the components are able to slide relative to one another in the shear plane. A drawback here is that the shear element fragments, which are thus loose, fall outwardly out of the opening in an uncontrolled manner and are able to move freely in the steering column or the passenger compartment of the motor vehicle, and may disrupt and impair the function of the steering column and energy absorption device and may even lead to injury of the vehicle driver.

Thus a need exists for an improved predetermined breaking connection with a shear element and to increase the operational reliability.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art The present disclosure generally relates to steering columns for motor vehicles. In some examples, such a steering column may have a crash device that has at least two components that have mutually facing surfaces. The at least two components may be connected to each other by way of a shear element that is arranged in an opening passing at least partially through the components, such that the shear element is broken in two if the components move relative to each other.

In a steering column for a motor vehicle, having a crash device which has at least two components which have mutually facing surfaces, wherein the at least two components are connected to each other by means of a shear element which is arranged in an opening passing at least partially through the components, such that the shear element is broken in two if the components move relative to each other, according to the invention it is provided that the opening has, in at least one edge region bounding the surface, a widened portion which extends at least over a partial circumferential region and is open towards the respective other contact surface.

The through-opening extends through the components connected together by means of the shear element and is formed by respective individual openings in each component which at least partially overlap, preferably are coaxial and/or aligned with one another.

The surfaces may be spaced apart from one another, preferably the spacing is less than 5 mm. Alternatively, an intermediate element, such as for example a film, sliding film or the like, may be arranged between the surfaces.

Preferably, the surfaces may be configured as contact surfaces which lie against one another in a shear plane, wherein the opening passes at least partially through the two components transversely to the shear plane. The relative movement of the components then takes place as a shear movement parallel to the shear plane.

On its opening edge, at the transition with at least one surface or contact surface, the opening may have a shear edge which is configured to shear off the shear element with a relative movement of the components parallel to the surface, preferably with a relative shear movement parallel to the shear plane. According to the invention, in the region of at least one shear edge on one of the components, preferably on both components, the opening cross section may be locally enlarged in a widened region bounding the surface and/or contact surface, for forming the widened portion. For example, a recess or indentation extending at least partially over the circumference of the opening may be configured in the edge region of the opening which is formed between the inner surface of the opening and the contact surface, so that in the region of the widened portion the opening cross section in the radial direction is enlarged at that point, i.e. transversely to the direction of passage of the opening. As a result, in the connected state, as long as the shear element is intact, a free space is formed between the shear element and the inner surface of the opening in the region of the widened portion. This free space, also denoted hereinafter as the deformation space, surrounds the shear element at least in some sections in the shear plane. The deformation space may be provided simply by the opening cross section being locally enlarged by treating the contact surface.

With a relative movement of the components parallel to the surfaces oriented towards one another, the shear element between the components is sheared off and broken in two and/or separated thereby, i.e. divided into two shear element fragments.

Preferably, the shear element predominantly fills up the passage cross section of the opening, this is the opening cross section outside the widened portion, substantially entirely, i.e. with little play, in other words by at least 95%. In this case, hollow spaces in the shear element itself are preferably not taken into account. As a result, in the prior art the shear element in the normal connected state lies in the region of the shear plane against the shear edges of the openings located on the opening edge. As a result, when the shear force is exceeded in the event of a crash, the shear element is cleanly and smoothly separated, even in the case of a minimum shear displacement in the shear plane, so that the shear element fragments thus formed are able to be moved counter to the normal direction of the contact surfaces out of the openings in the direction of passage and fall outwardly out of the components.

However, according to the invention, by means of the widened portion, the spacing transversely to the direction of passage between the outer circumference of the shear element and the inner circumference of the opening may be enlarged in a defined manner in the region of the shear edges for forming a deformation space. As a result, in the event of a crash, a plastic deformation of the shear element initially takes place in the region of the surfaces and/or contact surfaces/shear plane in which the material of the shear element initially flows due to the shear load transversely to the direction of passage and is pressed plastically thereby into the deformation space provided by the widened portion, and thus at least partially fills up this deformation space. The shear element is sheared off only after the widened portion has been at least partially filled up, by a further relative movement of the components.

By the shear element being plastically pressed into the deformation space of the widened portion according to the invention, a defined retaining ridge protruding transversely to the direction of passage is formed on the shear element fragment during the shearing off process. The widened portion is dimensioned such that in the region of the widened portion the retaining ridge protrudes transversely over the opening cross section outside the widened portion and, as a result, forms a positive connecting element which positively retains the shear element fragment in the opening in the direction of passage counter to the normal direction of the contact surface. The retaining ridge forms a type of rivet head by which the shear element fragment, which is formed when the shear element is sheared off, is retained in the opening counter to the normal direction of the contact surface. As a result, the shear element fragment is secured on the component between the retaining ridge formed according to the invention and a shear element head supported on an outer surface remote from the contact surface, and is not able to drop out of the opening in an uncontrolled manner. The normal direction is the direction which is at right angles to the surface and/or contact surface and the direction thereof faces away from the surface in the direction of the other surface.

A widened portion according to the invention may be provided in the region of the contact surface of one of the components or even on the two opposing contact surfaces of both components. The deformation space available for forming the retaining ridge according to the invention is determined by the free cross section between the shear element and the inner surface of the widened portion. The configuration of widened portions on the surfaces and/or on the two contact surfaces has the advantage that each of the shear element fragments formed during the shearing off process is in each case positively fixed to the respective component.

Preferably, the opening has at least in some sections a substantially uniform passage cross section which is enlarged in the region of the widened portion towards the surface and/or contact surface. The passage cross section corresponds to the aforementioned opening cross section outside the widened portion, which is preferably substantially filled up by the shear element. For forming the widened portion, the passage cross section may be simply enlarged by a widened portion. In this case the widened portion preferably extends in a component over a partial region of the length of the opening, which when measured in the direction of passage of the opening transversely to the shear plane corresponds to the thickness of the component between the contact surface thereof and an outer surface. The passage cross section outside the widened portion thus remains substantially the same if the smallest passage cross section is a maximum of 20% smaller in terms of surface area than the largest passage cross section in terms of surface area.

The length of the widened portion in the direction of passage of the opening is preferably less than 50% of the thickness of the component, measured between the surface and/or the contact surface and an outer surface remote therefrom. On the contact surface the exit cross section of the widened portion, corresponding to the cross section of the deformation space and thus of the retaining ridge, is larger than the smallest passage cross section. Cross sections are preferably to be understood to mean the cross-sectional surface areas.

It may be provided that the widened portion has a chamfer and/or a rounding and/or a shoulder. As a chamfer, the opening edge may be configured to be conical or rounded relative to the contact surface. A widened portion of the opening which is open in a substantially funnel-shaped manner towards the contact surface may be configured by means of a conical chamfer.

It is advantageous that the chamfer encloses with an opening axis of the opening a chamfer angle which is greater than or equal to 20°, preferably 30°. An axis running in the direction of passage of the opening is regarded as the opening axis, preferably parallel to the normal direction of the contact surface. If the opening is configured as a circular cylindrical bore, for example, the opening axis is identical to the bore axis. As a result, it is ensured that a widened portion which is sufficient for forming a retaining ridge in order to generate a secure positive connection may be implemented in a relatively short widened portion. Moreover, a reliable plastic shaping into the deformation space for forming the retaining ridge may be ensured without premature shearing off which is undesired.

Alternatively or additionally, the opening edge may have a rounding. The rounding may be configured circumferentially or at least in some sections to be toroidal-convex, i.e. arcuate in cross section. The arcuate rounding has the advantage that the plastic deformation gradually takes place along a curved portion when the widened portion is filled up and notch effects which could occur on a sharp edge may be reduced. Preferably, the rounding may have a radius of greater than or equal to 0.5 mm, particularly preferably greater than or equal to 1 mm.

Alternatively or additionally, the opening edge may have a shoulder which may be configured as an at least partially circumferential step. Such a step may be implemented, for example, by the widened portion having a stepped bore which is incorporated in the contact surface and which has a greater diameter, the widened portion diameter, which is greater than the opening cross section which in the case of a round opening corresponds to the opening and/or passage diameter.

The opening may be configured as a bore with a circular cross section. The bore has a bore diameter or opening diameter which in the widened portion towards the contact surface is enlarged to a larger widened portion diameter relative thereto. For example, the bore may be widened in a conical-funnel-shaped manner by a conical chamfer. A stepped bore incorporated by the contact surface may also be provided, wherein a shoulder or a step is formed between the larger widened portion diameter and the bore diameter. Adapted to the bore, the shear element may also have a circular cross section with a shear element diameter so that it substantially, i.e. predominantly, fills up the bore cross section with little play.

It is conceivable and possible that for the optimized formation of the retaining ridge and for adapting the shear characteristic to the two contact surfaces lying against one another, differently designed widened portions may be combined together, for example a conical opening edge on the one side, with a rounded opening edge on the other contact surface.

The widened portion may extend over the entire circumference of the opening or over partial circumferential regions. Preferably, the widened partial circumferential regions are located in the shear direction, i.e. in the direction of the mutual shear movement of the two components. A partial shear geometry is produced, which permits an optimized introduction of the shear force.

Preferably the shear element may be configured as a rivet. A rivet may be configured, for example, as a solid rivet, hollow rivet or tubular rivet, semi-hollow rivet, retaining ring rivet, or the like, in which rivet heads are plastically shaped on a rivet shaft passing through the opening on both sides outside the two components, said rivet heads in each case being positively supported on the outer faces of the components in the direction of passage of the opening. Preferably the rivet has a round rivet cross section adapted to the round opening cross section. As the rivet has at least in the region of the shear plane a defined solid or hollow cross section, consisting of a material with defined shear strength which is less than the strength of the material of at least one of the two components, the breakaway or breakloose behavior of the shear connection may be predetermined in a defined manner.

It may be advantageous that the one component is connected to a jacket unit rotatably mounting a steering spindle and the other component is connected to a support unit bearing the jacket unit and connectable to the body of a motor vehicle. The one component may be connected, for example, to a jacket tube, which in the event of a crash is able to be telescoped in the direction of the longitudinal axis of the steering column, about which the steering spindle is rotatable, relative to a further component which in turn is connected to a jacket unit or a support unit which is supported directly or indirectly on the body of a motor vehicle in the longitudinal direction.

It is advantageous that the shear element is configured at least in the region of the shear plane from a material which has a lower strength than the material of at least one of the components, preferably a lower strength than the materials of the components. If the components are produced from steel, for example, the shear element may be produced, for example, from aluminum, non-ferrous metal, plastics or the like. If other materials are used for the components, the shear strength of the shear element may be adapted thereto so that it is ensured that in the event of a crash the shear element is reliably separated and no damage occurs to the components during the shearing off process.

An advantageous embodiment of the invention provides that an energy absorption element is arranged between the components. In this arrangement, the shear element forms a predetermined breaking element which is arranged parallel to at least one energy absorption element, relative to the transmission of force in the direction of the shear movement in the event of a crash, and ensures that in normal operation forces occurring between the two components are absorbed and are not able to act on the energy absorption element. The shear element is sheared off and releases the relative movement of the two components such that the energy absorption element(s) may be deformed to absorb kinetic energy only when a predetermined limit force is exceeded, which occurs in the event of a crash. The energy absorption element may be inserted and supported, for example, between the outer jacket unit and inner jacket tube so that in the event of a crash, after the shear element is sheared off, a braked telescoping of the steering column is possible. In the prior art, for example, bending tabs and/or tear tabs, pinching elements, separating elements or expansion elements are known in many different embodiments as energy absorption elements, which permit a conversion of kinetic energy into plastic deformation work via a predetermined deformation path. Relative to the design according to the invention, the deformation path extends in the shear direction, for example the longitudinal direction of a telescopable steering column arrangement.

The invention further relates to a method for operating a steering column for a motor vehicle, having a crash device which has at least two components which have mutually facing surfaces and which are connected to each other by means of a shear element which is arranged in an opening which passes at least partially through both components and which has a shear edge at the transition with at least one surface, wherein the shear element is sheared off and divided into two shear element fragments when a predetermined crash force acting between the components is exceeded, wherein it is proposed according to the invention that at least one of the shear element fragments is plastically shaped into a widened portion configured in at least one edge region of the opening bounding a contact surface, in order to form a retaining ridge which produces a positive connection which acts in the direction of passage of the opening between the shear element fragment and the component.

Preferably a method for operating a steering column for a motor vehicle is proposed, having a crash device which has two components which lie against one another on mutually facing contact surfaces in a shear plane and which are connected together by means of a shear element which is arranged in an opening which passes through both components transversely to the shear plane and which has a shear edge at the transition with at least one contact surface, wherein when a predetermined crash force acting between the components in the direction of the shear plane is exceeded, the shear element is sheared off and divided into two shear element fragments, wherein according to the invention it is proposed that at least one of the shear element fragments is plastically shaped into a widened portion configured in at least one edge region of the opening bounding a contact surface, in order to form a retaining ridge which generates a positive connection acting in the direction of passage of the opening between the shear element fragment and the component.

As already described above, the opening has on at least one contact surface, preferably on both contact surfaces, a widened portion which extends at least over a partial circumferential region and is open towards the contact surface. In the method according to the invention, in the event of a crash a part of the kinetic energy acting between the components in the shear direction is initially used in order to press the shear element plastically in the region of the shear plane into the deformation space formed therein according to the invention in the region of the widened portion. As a result, a retaining ridge is plastically deformed on the shear element and protrudes transversely over the opening cross section outside the widened portion. After, or in some cases during, the plastic deformation for forming the retaining ridge, the shear element is sheared off on the shear edges arranged externally on the edge of the widened portion relative to the contact surface. Due to the deformation in the widened portion according to the invention, one or both of the shear element fragments has/have a retaining ridge which ensures a positive fixing to the component(s) in the direction of passage.

In the event of a crash, due to the crash energy the shear element may be plastically deformed by means of the widened portion according to the invention, which permits a secure fixing of the shear element fragments and as a result avoids disruptions to the energy absorption. As a result, the level of safety may be increased.

Figure 1:
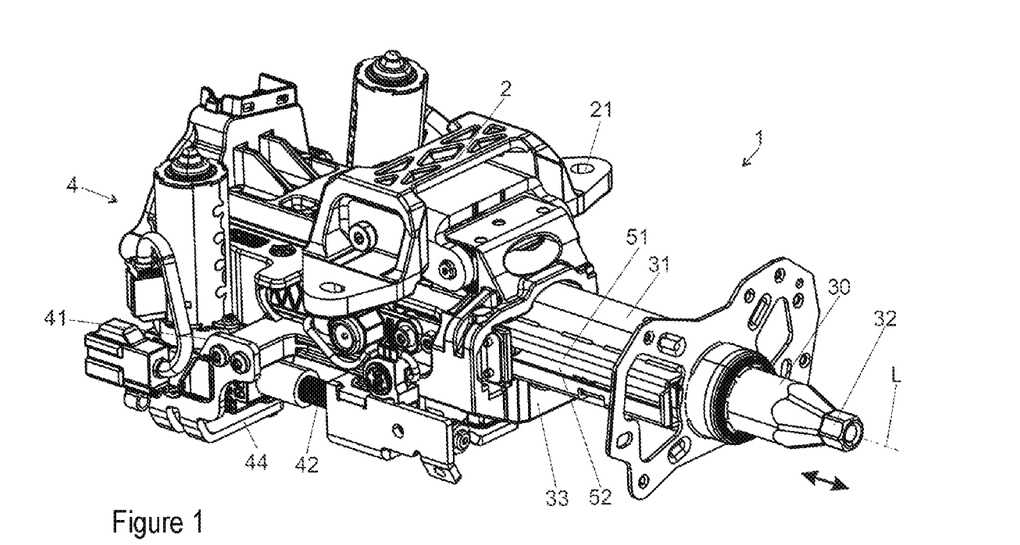
FIG. 1 is a perspective view of an example steering column.

FIG. 1 shows a steering column 1 according to the invention schematically in a perspective view obliquely from the rear (relative to the direction of travel of a motor vehicle, not shown).

The steering column 1 may be fastened to the body of a motor vehicle, not shown, by means of a support unit (bracket) 2. The support unit 2 comprises fastening means 21, for example fastening openings, for connecting to the body.

A steering spindle 30 is rotatably mounted in an inner jacket tube 31, also denoted as the internal jacket tube or jacket tube 31, about its longitudinal axis L which extends in the longitudinal direction. A fastening portion 32 is configured at the rear on the steering spindle 30 for fastening a steering wheel, not shown. The inner jacket tube 31 is retained in an outer jacket unit 33, also denoted as the external jacket unit 33 or the jacket unit 33 for short, so as to be displaceable in a telescopic manner in the longitudinal direction, as indicated by the double arrow parallel to the longitudinal axis L.

A motorized adjusting drive 4 comprises an electrical drive unit 41 with an electric motor which is supported on the outer jacket unit 33 in the longitudinal direction by means of a U-shaped support component 44 and by which a threaded spindle (spindle) 42 extending substantially in the longitudinal direction is rotatably drivable, said threaded spindle being screwed into a spindle nut 43 which is arranged fixedly in terms of rotation relative thereto and which is supported on the inner jacket tube 31 in the longitudinal direction via a support element 45. As a result, a so-called rotary spindle drive is implemented in which, by the threaded spindle 42 being rotatably driven by means of the drive unit 41, the spacing is adjustable in the longitudinal direction between the drive unit 41 and spindle nut 43. By activating the drive unit 41, the inner jacket tube 31 may be retracted or extended relative to the outer jacket unit 33 for the longitudinal adjustment of the steering column 1 in a telescopic manner, as indicated by a double arrow.

Figure 2:
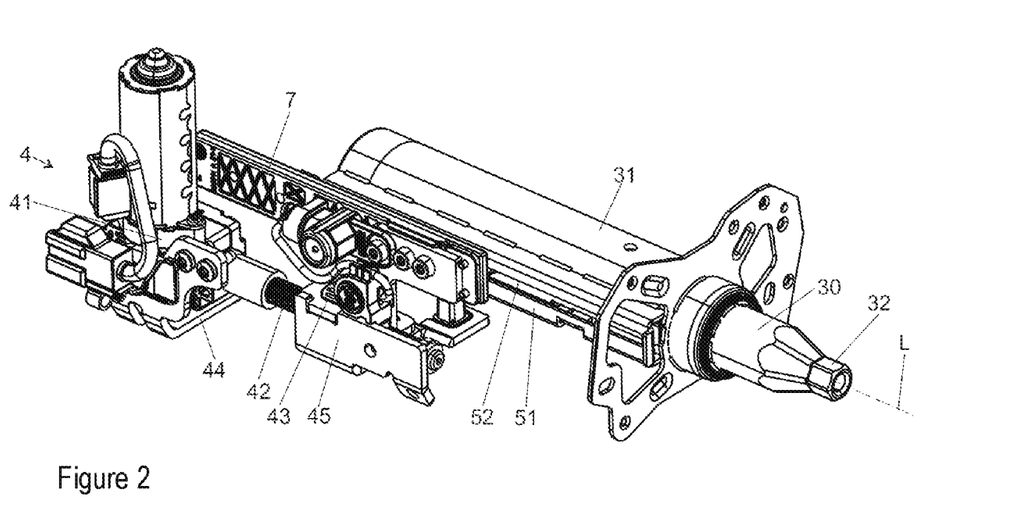
FIG. 2 is another perspective view of the steering column according to FIG. 1.
Figure 3:
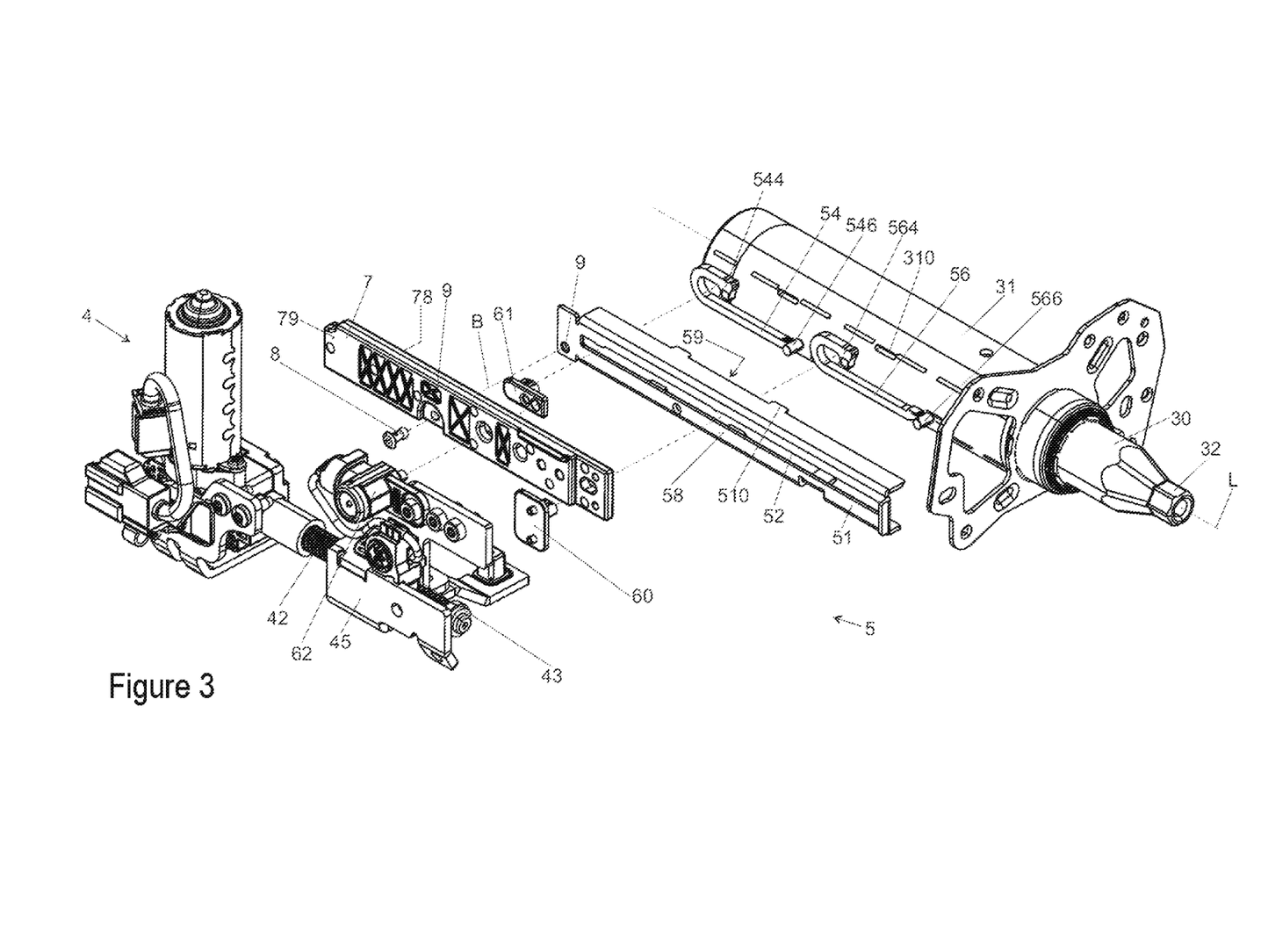
FIG. 3 is a detail, exploded view of the steering column according to FIG. 1.

An energy absorption device 5 is arranged between the outer jacket unit 33 and the inner jacket tube 31, said energy absorption device being described in more detail hereinafter. This energy absorption device is able to be identified in FIG. 2 in which the support unit 2 and the outer jacket unit 33 are omitted for greater clarity, in the same perspective as in FIG. 1. FIG. 3 shows an exploded view of the arrangement of FIG. 2 exploded transversely to the longitudinal axis L.

The energy absorption device 5 has a housing 51, also denoted as the retaining profile 51, in the form of a C-shaped rail with a substantially rectangular cross section which is fixedly connected to the inner jacket tube 31 and extends in the longitudinal direction, wherein the open cross section is oriented towards the outer face of the inner jacket tube 31. By means of positive connecting elements 510 which engage in corresponding receiving openings 310 in the internal jacket tube 31, the housing 51 is fixedly connected to the jacket tube 31, for example by means of laser welding. On its radially outwardly oriented outer face, the housing 51 has a slot 52 extending parallel to the longitudinal axis L.

A first energy absorption element 54 and a second energy absorption element 56, which in each case are designed as a U-shaped bending wire and/or bending strip, with a first limb which is connected to a second limb via a portion bent-back by substantially 180°, are arranged spaced apart in the longitudinal direction in the housing 51. In each case, a driver hook 544 and/or 564 is configured at the end of the second limb. In each case, the energy absorption elements 54 and 56 are supported with their first limb counter to the longitudinal direction against abutments 546 and/or 566 which protrude inwardly into the cross section of the housing 51 and which in each case form a stop in the longitudinal direction.

The energy absorption elements 54 and 56 may be configured as stamped parts so that a cost-effective production is ensured.

The housing 51 forms a first component in the context of the present invention, which is fixedly connected to the inner jacket tube 31. The housing 51 has an external contact surface 58 relative to the inner jacket tube 31 parallel to the longitudinal axis L, which in FIG. 3 faces the observer.

A carrier plate 7 has a contact surface 78 which is parallel to the contact surface 58 and which in the mounted state lies flat against the contact surface 58 of the housing 51 in a shear plane S, as is described in more detail below.

The spindle nut 43 is connected via the support element 45 to the carrier plate 7 and is supported in the longitudinal direction.

A first coupling element 60 is supported in the longitudinal direction fixedly on the carrier plate 7 and extends through the slot 52 and is connected to the driver hook 564 of the energy absorption element 56.

A second coupling element 61 may be coupled by means of a pyroelectric actuator 62, which is fixedly connected to the carrier plate 7, through the slot 52 to the driver hook 544 of the energy absorption element 54.

A shear rivet 8 which forms a shear element according to the invention is guided through an opening 9 which passes transversely to the longitudinal axis L through the carrier plate 7 and the housing 51 and which is configured in the example as a bore with a circular passage cross section having a bore axis B. In normal operation, the carrier plate 7 is connected to the housing 51 by the shear rivet 8, wherein the contact surfaces 58 and 78 in the shear plane S lie against one another as may be identified in the cross-sectional views of FIGS. 4, 5, 6, 8, 10, 11 and 12.

Figure 4:
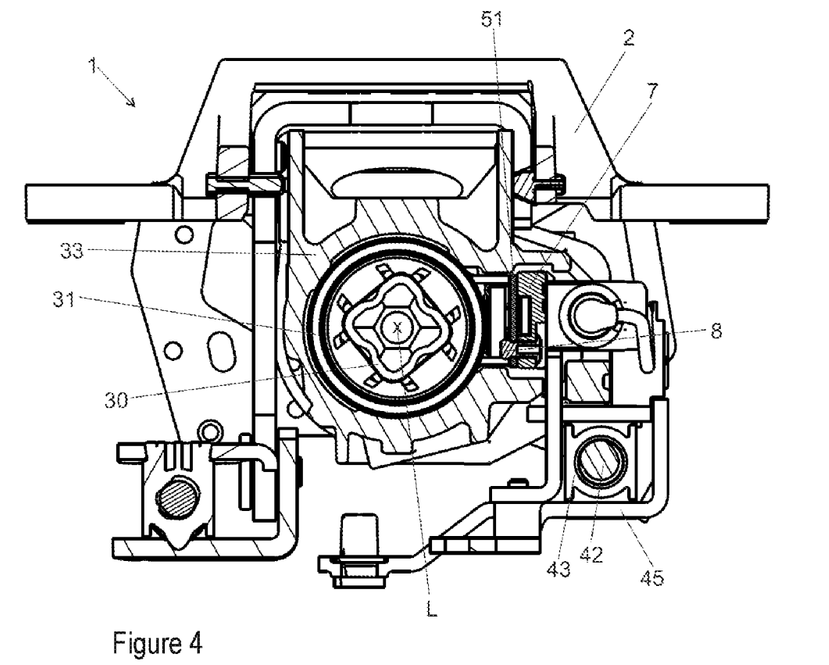
FIG. 4 is a cross-sectional view through the steering column according to FIGS. 1 to 3.
Figure 5:
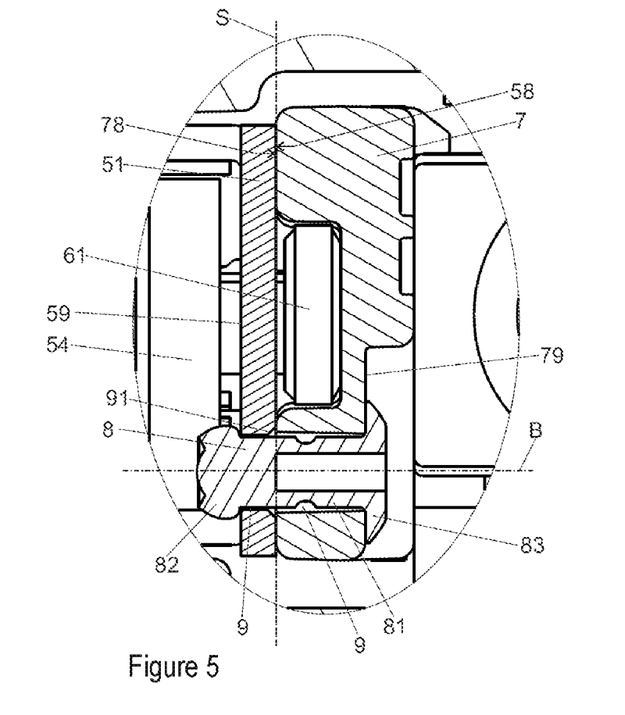
FIG. 5 is an enlarged detail view of the steering column of FIG. 4.

FIG. 5 shows an enlarged part of the overall cross section of FIG. 4. In FIGS. 6 to 12 only the elements which are essential to the invention, the shear rivet 8, carrier plate 7 and housing 51 are schematic.

The shear rivet 8 has a rivet shaft 81, also denoted as the shaft for short, which extends through the opening 9 and which has a circular cylindrical rivet cross section substantially filling up the opening cross section, such that only a little play, which is only a fraction of the rivet shaft diameter and/or opening diameter, is present between the rivet shaft 81 and the inner surface of the opening 9.

By means of a first rivet head 82 the shear rivet 8 is supported outwardly against an outer surface 59 of the housing 51 remote from the contact surface 58, and by means of a second rivet head 83 the shear rivet is supported from outside against an outer surface 79 of the carrier plate 7 remote from the contact surface 78. The contact surface 58 of the housing 51 and the contact surface 78 of the carrier plate 7 are braced relative to one another in the shear plane by means of the shear rivet 8.

Figure 10:
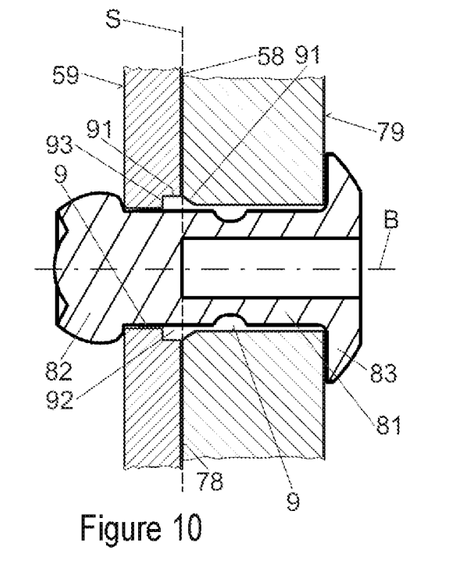
FIG. 10 is an enlarged schematic view of a shear rivet connection in a third embodiment.
Figure 11:
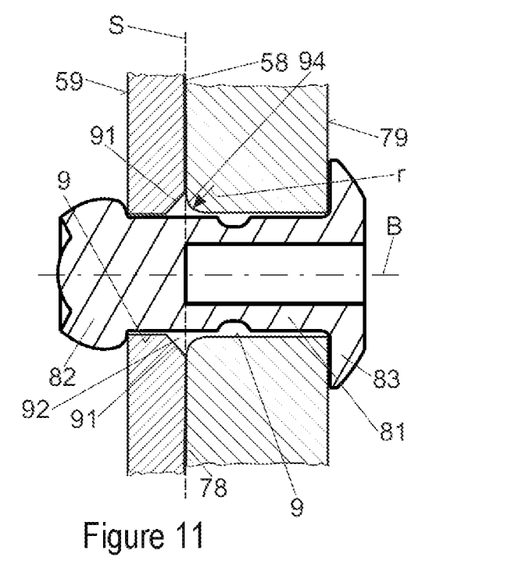
FIG. 11 is an enlarged schematic view of a shear rivet connection in a fourth embodiment.
Figure 12:
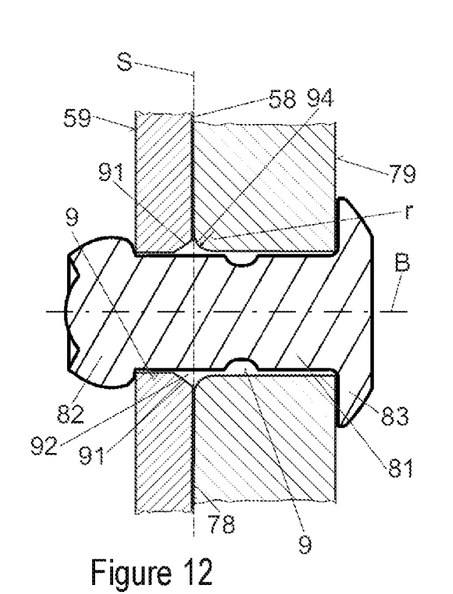
FIG. 12 is an enlarged schematic view of a shear rivet connection in a fifth embodiment.

The shear rivet 8 may be designed as a hollow rivet or semi-hollow rivet as shown in FIGS. 6 to 11, or even as a solid rivet as shown in FIG. 12.

Figure 6:
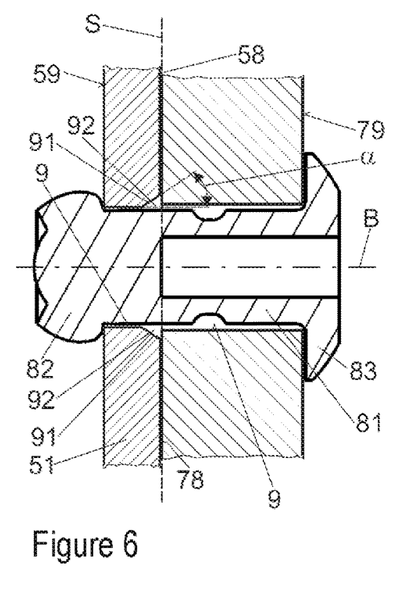
FIG. 6 is an enlarged schematic view of an example shear rivet connection in a first embodiment in normal operation, before being sheared off.

In the embodiment shown in FIG. 6 the opening 9 in the housing 51 has a circumferential chamfer in at least one edge region bounding a contact surface 58, so that a conical-funnel-shaped widened portion 91 which is open towards the contact surface is formed. The chamfer encloses with the bore axis B a chamfer angle $\alpha$ (alpha) preferably greater than or equal to 20°, preferably 30°. An annular free deformation space 92 is defined between the cylindrical outer face of the rivet shaft 81 and the conical inner face of the widened portion 91.

Figure 7:
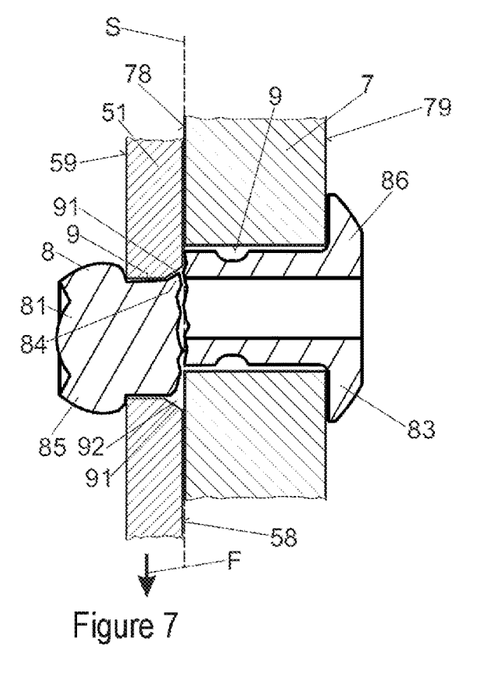
FIG. 7 is an enlarged schematic view of the shear rivet connection according to FIG. 6 after being sheared off.

The carrier plate 7 is supported via the adjusting drive 4 and the outer jacket unit 33 by means of the support unit 2 on the body of the motor vehicle, and the housing 51 on the inner jacket tube 31. In the event of a crash, a high force peak, the so-called crash force F is transmitted in a pulsed manner via the steering spindle 30 to the inner jacket tube 31, said crash force acting as a shear force F parallel to the shear plane S between the housing 51 and the carrier plate 7 as shown in FIG. 7. In the event of a crash the inner jacket tube 31 together with the housing 51 are displaced relative to the carrier plate 7. As a result, the shear element 8 is subjected to shear force and is thereby deformed in the region of the widened portion 9. In practice, the material of the shear element 8 flows approximately in the direction of the shear plane S into the free deformation space 92—upwardly in the view of FIG. 7—and forms therein a plastically shaped retaining ridge 84 which fills up the deformation space 92 at least partially transversely to the bore axis B provided by the widened portion.

By the further relative movement, the shear element 8 is sheared off in the shear plane S and divided into two separate shear rivet fragments 85, 86, the fragments 85, 86 for short.

In FIG. 7 the shear rivet fragment 85 is fixed by the retaining ridge 84 protruding into the widened portion 91 transversely to the bore axis B in the direction of passage of the bore 9 and secured against dropping outwardly. The retaining ridge 84 forms a positive connection element which acts in the direction of passage of the opening 9 and which was generated during the shearing off process.

In order to secure the second shear rivet fragment against falling out of the opening 9 of the carrier plate 7, the opening 9 in the carrier plate 7 may also have a widened portion 91 in the form of a circumferential chamfer in at least one edge region bounding a contact surface 78, whereby in principle a deformation space 92 which is mirror-symmetrical to the deformation space 92 in the housing 51 relative to the shear plane S is formed in the carrier plate 7. This arrangement is shown as the second variant in FIG. 8 in the same view as in FIG. 6. However, a mirror-symmetrical configuration of the deformation space 92 is not essential for guaranteeing the functionality. This deformation space may also be smaller or larger than the other deformation space or may have a different geometry.

Figure 9:
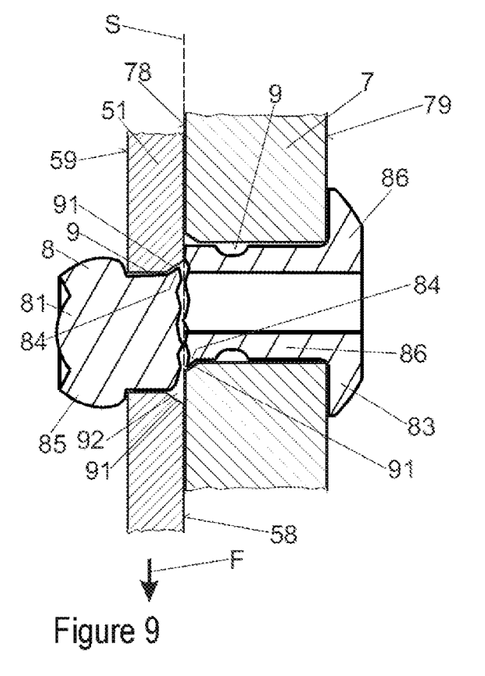
FIG. 9 is an enlarged schematic view of the shear rivet connection according to FIG. 8 after being sheared off.

FIG. 9 shows in a similar manner to FIG. 7 the sheared off state. As in FIG. 7 the shear rivet fragment 85 has a retaining ridge 84, in the drawing at the upper edge of the rivet shaft 81. The shear rivet fragment 86—located to the right in the drawing—has also been plastically deformed before being sheared off, such that a retaining ridge 84 has been configured so as to protrude into the deformation space 92 defined by the widened portion 91—at the lower edge in the drawing. As a result, in the opening 9 the shear rivet fragment 86 is positively held and secured on the carrier plate 7.

Figure 8:
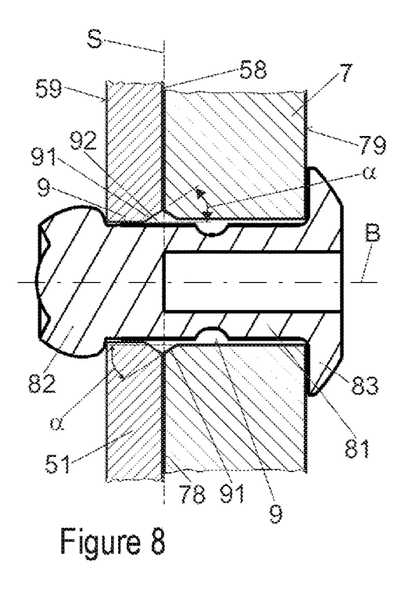
FIG. 8 is an enlarged schematic view of a shear rivet connection in a second embodiment in normal operation before being sheared off.

The third variant shown in FIG. 10 differs from the embodiment according to FIG. 8 in that the widened portion 91 in the housing 51 is a stepped bore with a shoulder 93 protruding relative to the passage cross section. As a result, the deformation space 92 is annular-hollow cylindrical.

The fourth variant shown in FIG. 11 differs from the embodiment according to FIG. 8 in that the widened portion 91 in the carrier plate 7 is not configured as a conical chamfer as in FIG. 8 but so as to be arcuate in cross section as a rounding 94 of the edge, with a radius r greater than or equal to 0.5 mm.

The embodiment shown in FIG. 12 differs from the above variants in that the shear rivet 8 is designed as a solid rivet. Naturally the other variants of FIGS. 1 to 11 may be designed with a solid rivet instead of a hollow rivet. The person skilled in the art accordingly selects the rivet such that the shear force selected and predefined thereby is achieved by this selected rivet.

Figure 13:
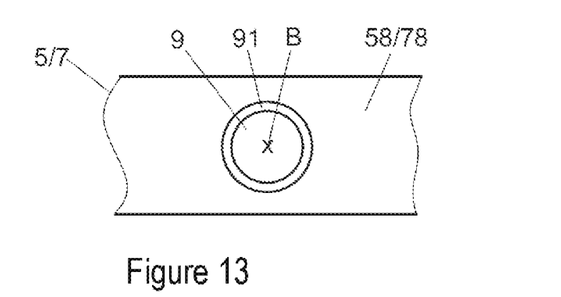
FIG. 13 is a schematic view of a contact surface in a direction of passage of the opening in a first embodiment.
Figure 14:
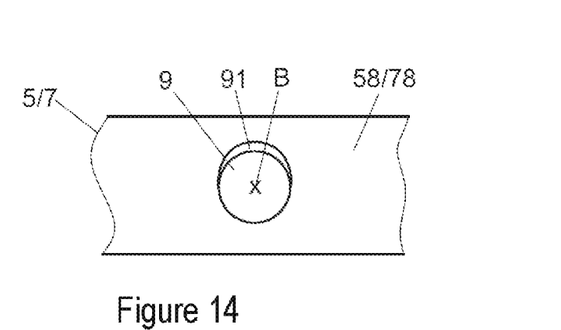
FIG. 14 is another schematic view of the contact surface of FIG. 13 with a widened portion configured only partially in a circumferential region.

FIGS. 13 and 14 show views in the normal direction of the contact surfaces 58 or 78. In the embodiment of FIG. 13 the widened portion 91 circulates around the entire circumference of the opening 9, while in FIG. 14 the widened portion 91 is configured only partially in the circumferential region, in which during the crash the retaining ridge 84 on the shear rivet fragments 85 and/or 86 is plastically deformed by the crash force F. The variants shown in FIGS. 1 to 12 may be implemented both with a widened portion over the entire circumference and with a partial widened portion. The geometry of the widened portion is thus correspondingly configured over the entire circumference or partially over the circumference, wherein a combination thereof is also conceivable and possible, namely that the one widened portion of the one component is configured over the entire circumference and the widened portion of the other component is configured partially over the circumference.

LIST OF REFERENCE NUMERALS

1 Steering column
2 Support unit
21 Fastening means
30 Steering spindle
31 Inner jacket tube
310 Receiving openings
32 Fastening portion
33 Outer jacket unit
4 Adjusting drive
41 Drive unit
42 Threaded spindle
43 Spindle nut
45 Support element
5 Energy absorption device
51 Housing
510 Positive connection elements
52 Slot
54, 56 Energy absorption element
544, 564 Driver hook
546, 566 Abutment
57 Opening
58 Contact surface
59 Outer surface
60, 61 Coupling element
62 Pyroelectric actuator
7 Carrier plate
78 Contact surface
8 Shear rivet
81 Rivet shaft
82, 83 Rivet head
84 Retaining ridge
85, 86 Shear rivet fragments
9 Opening
91 Widened portion
92 Deformation space
93 Shoulder
L Longitudinal axis
H Vertical direction
S Shear plane
B Bore axis

The invention claimed is:

1. A steering column for a motor vehicle comprising a crash device with at least two components that have mutually facing surfaces, wherein the at least two components are connected by a shear element that is disposed in an opening passing at least partially through the at least two components such that the shear element is configured to break in two if the at least two components move relative to each other, wherein the opening has in at least an edge region bounding a first of the mutually facing surfaces a first widened portion that extends at least over a partial circumferential region and is open towards a second of the mutually facing surfaces and wherein an edge region bounding the second of the mutually facing surfaces a second widened portion that extends at least over a partial circumferential region and is open towards the first of the mutually facing surfaces.

2. The steering column of claim 1 wherein the mutually facing surfaces are configured as contact surfaces that lie against one another in a shear plane, wherein the opening passes at least partially through the at least two components transversely to the shear plane.

3. The steering column of claim 2 wherein the opening includes at least in some sections a substantially uniform passage cross section that is enlarged in the edge region of the widened portion towards the contact surfaces.

4. The steering column of claim 1 wherein the widened portion has at least one of a chamfer, a rounding, or a shoulder.

5. The steering column of claim 1 wherein the widened portion has a chamfer that encloses with an opening axis of the opening a chamfer angle that is greater than or equal to 20°.

6. The steering column of claim 1 wherein the opening is a bore with a circular cross section.

7. The steering column of claim 1 wherein the shear element is a shear rivet.

8. The steering column of claim 1 wherein a first of the at least two components is connected to a jacket unit rotatably mounting a steering spindle, wherein a second of the at least two components is connected to a support unit that bears the jacket unit and is connectable to a body of the motor vehicle.

9. The steering column of claim 1 wherein the mutually facing surfaces are configured as contact surfaces that lie against one another in a shear plane, wherein at least in a region of the shear plane the shear element is comprised of a material that has a lower strength than a material of at least one of the at least two components.

10. The steering column of claim 1 comprising an energy absorption element that is arranged between the at least two components.

11. A method of operating a steering column for a motor vehicle that includes a crash device with two components that have mutually facing surfaces and that are connected by a shear element that is disposed in an opening passing at least partially through the two components, the method comprising:
  shearing off the shear element and dividing the shear element into two shear element fragments upon application of a force between the two components that exceeds a predetermined crash force; and
  plastically shaping each of the two shear element fragments to include a widened portion configured in at least a respective edge region of the opening bounding each of the mutually facing surfaces to form a retaining edge that produces a positive connection that acts in a direction of passage of the opening between the at least one of the shear element fragments and the respective component.

* * * * *